(12) United States Patent
Cheng et al.

(10) Patent No.: US 10,922,364 B2
(45) Date of Patent: Feb. 16, 2021

(54) WEB CRAWLING METHOD AND SERVER

(71) Applicant: TENCENT TECHNOLOGY (SHENZHEN) COMPANY LIMITED, Guangdong (CN)

(72) Inventors: Zhi Feng Cheng, Shenzhen (CN); Bai Yu Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 158 days.

(21) Appl. No.: 16/285,836

(22) Filed: Feb. 26, 2019

(65) Prior Publication Data
US 2019/0188226 A1    Jun. 20, 2019

Related U.S. Application Data

(63) Continuation of application No. PCT/CN2017/109752, filed on Nov. 7, 2017.

(30) Foreign Application Priority Data

Dec. 8, 2016 (CN) .......................... 201611121344.3

(51) Int. Cl.
*G06F 16/951* (2019.01)
*G06F 16/955* (2019.01)
(Continued)

(52) U.S. Cl.
CPC ............ *G06F 16/951* (2019.01); *A63F 13/35* (2014.09); *A63F 13/60* (2014.09); *A63F 13/77* (2014.09); *G06F 17/18* (2013.01)

(58) Field of Classification Search
CPC .... G06F 16/951; G06F 16/955; G06F 16/958; G06F 17/18; A63F 13/35; A63F 13/60;
(Continued)

(56) References Cited

U.S. PATENT DOCUMENTS

2002/0013838 A1\* 1/2002 Kushida ................ H04L 67/101
709/223
2010/0311433 A1\* 12/2010 Lindskog .......... H04W 72/1242
455/450
(Continued)

FOREIGN PATENT DOCUMENTS

CN    102054028 A    5/2011
CN    102880607 A    1/2013
(Continued)

OTHER PUBLICATIONS

Communication dated Feb. 3, 2020, from The State Intellectual Property Office of the P.R. of China in Application No. 201611121344.3.
(Continued)

*Primary Examiner* — Seo Hlaing
(74) *Attorney, Agent, or Firm* — Sughrue Mion, PLLC

(57) ABSTRACT

A web page grabbing method is provided. A target web page on a website is grabbed, the target web page including a web page corresponding to a Hypertext Markup Language 5 (H5) content and a web page corresponding to a non-H5 content. The web page corresponding to the H5 content is detected according to web page source code of the target web page. Dynamic rendering is performed on the web page corresponding to the H5 content, to obtain a rendered web page. Content details information corresponding to the H5 content is extracted from the rendered web page.

19 Claims, 7 Drawing Sheets

(51) Int. Cl.
    *G06F 16/958*    (2019.01)
    *G06F 17/18*    (2006.01)
    *A63F 13/35*    (2014.01)
    *A63F 13/60*    (2014.01)
    *A63F 13/77*    (2014.01)

(58) Field of Classification Search
    CPC ... A63F 13/77; A63F 2300/535; A63F 13/335
    See application file for complete search history.

(56) References Cited

U.S. PATENT DOCUMENTS

| | | | |
|---|---|---|---|
| 2013/0024441 A1 | 1/2013 | Sun et al. | |
| 2014/0344332 A1* | 11/2014 | Giebler | H04L 67/42 709/203 |
| 2015/0234827 A1* | 8/2015 | Lin | G06F 16/24578 707/729 |
| 2016/0179835 A1* | 6/2016 | Mika | G06N 20/00 706/12 |
| 2017/0173467 A1* | 6/2017 | Li | G06F 9/455 |

FOREIGN PATENT DOCUMENTS

| | | |
|---|---|---|
| CN | 102890692 A | 1/2013 |
| CN | 103365919 A | 10/2013 |
| CN | 103365967 A | 10/2013 |
| CN | 103473358 A | 12/2013 |

OTHER PUBLICATIONS

Zhong Sun Dan Han, "How HTML5char(39)s Web Pages Judge", Qianfeng Education, Sep. 1, 2016, (https://zhidao.baidu.com/question/745737304415813572.Html), p. 1.

Written Opinion of the International Searching Authority for PCT/CN2017/109752 dated Jan. 3, 2018.

Office Action dated Jun. 19, 2020 from the State Intellectual Property Office of the P.R.C. in Application No. 201611121344.3.

International Search Report for PCT/CN2017/109752 dated, Jan. 3, 2018.

* cited by examiner

WEB CRAWLING METHOD AND SERVER

CROSS-REFERENCE TO RELATED APPLICATION(S)

This application is a continuation of International Application No. PCT/CN2017/109752, filed on Nov. 7, 2017, in the Chinese Patent Office, which claims priority to Chinese Patent Application No. 201611121344.3, entitled "WEB PAGE GRABBING METHOD AND APPARATUS", filed with the Chinese Patent Office on Dec. 8, 2016, the disclosures of which are incorporated herein by reference in their entireties.

BACKGROUND

1. Field

Methods and apparatuses consistent with exemplary embodiments relate to the field of computer networks, and in particular, to a web page grabbing method and a server.

2. Description of the Related Art

A Hypertext Markup Language 5 (H5) game is a game running on a World Wide Web (WWW or the Web) on an electronic device such as a smartphone or a tablet computer.

When establishing an H5 game website, a website administrator needs to collect game details information of multiple H5 games, for example, game names, game introduction information, and game running pictures. During a collection process, the website administrator grabs all web pages of an existing H5 game website by using a web crawler. All web pages include a web page corresponding to an H5 game and a web page corresponding to a non-H5 game. Then, information about details related to the H5 game is extracted manually from all web pages.

Because the web crawler can only simply grab all web pages in the foregoing technology, a large amount of manual work is needed to recognize the web page corresponding to the H5 game and extract information from the web page corresponding to the H5 game, leading to low efficiency and low accuracy in an entire extraction process.

SUMMARY

One or more exemplary embodiments provide a web page grabbing method and a server, which solve a problem in the related technology that the efficiency in extracting information from a web page corresponding to an H5 game is low.

According to an aspect of an exemplary embodiment, a web page grabbing method, which is performed by a web page grabbing apparatus including at least one processor, is provided. A target web page on a website is grabbed, the target web page including a web page corresponding to a Hypertext Markup Language 5 (H5) content and a web page corresponding to a non-H5 content. The web page corresponding to the H5 content is detected according to web page source code of the target web page. Dynamic rendering is performed on the web page corresponding to the H5 content, to obtain a rendered web page. Content details information corresponding to the H5 content is extracted from the rendered web page.

According to an aspect of another exemplary embodiment, a server including at least one memory configured to store program code; and at least one processor configured to access the at least one memory and operate according to the program code, is provided. The program code includes code configured to cause the at least one processor to grab a target web page on a website, the target web page including a web page corresponding to an H5 content and a web page corresponding to a non-H5 content; code configured to cause the at least one processor to detect the web page corresponding to the H5 content according to web page source code of the target web page; code configured to cause the at least one processor to perform dynamic rendering on the web page corresponding to the H5 content, to obtain a rendered web page; and code configured to cause the at least one processor to extract content details information corresponding to the H5 content from the rendered web page.

According to an aspect of another exemplary embodiment, a non-transitory computer readable storage medium, the storage medium storing at least one of at least one instruction, at least one segment of program, a code set, and an instruction set, is provided. The at least one of at least one instruction, at least one segment of program, a code set, and an instruction set, when executed by at least one processor, causes the at least one processor to perform: grabbing, by the at least one processor, a target web page on a website, the target web page including a web page corresponding to a Hypertext Markup Language 5 (H5) content and a web page corresponding to a non-H5 content; detecting, by the at least one processor, the web page corresponding to the H5 content according to web page source code of the target web page; performing, by the at least one processor, dynamic rendering on the web page corresponding to the H5 content, to obtain a rendered web page; and extracting, by the at least one processor, content details information corresponding to the H5 content from the rendered web page.

According to an aspect of another exemplary embodiment, a web page grabbing apparatus is provided. The web page grabbing apparatus includes at least one processor to implement: a grabbing module, configured to grab a target web page on a website, the target web page including a web page corresponding to an H5 content and a web page corresponding to a non-H5 content; a recognition module, configured to detect the web page corresponding to the H5 content according to web page source code of the target web page; a rendering module, configured to perform dynamic rendering on the web page corresponding to the H5 content, to obtain a rendered web page; and an extraction module, configured to extract content details information corresponding to the H5 content from the rendered web page.

According to an exemplary embodiment, the H5 content may include a H5 game content.

The technical solutions provided in the embodiments bring about the following beneficial effects:

The target web page on the website (e.g., game website) is grabbed, the web page corresponding to the H5 content (e.g., H5 game) is recognized according to the web page source code of the target web page, dynamic rendering is performed on the web page corresponding to the H5 content, to obtain the rendered web page, and the content details information corresponding to the H5 content is extracted from the rendered web page, so that the server can accurately recognize the web page corresponding to the H5 content according to source code of the web page, and extract the content details information from the web page, thereby solving the problem that a large amount of manual work is needed to perform screening and information extraction on a grabbing result in the related art technologies. Therefore, exemplary embodiments improve the accuracy of recognizing, by the server, the web page corresponding to the H5 content, and improve the efficiency of extracting the game details information by the server.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

Figure 1:
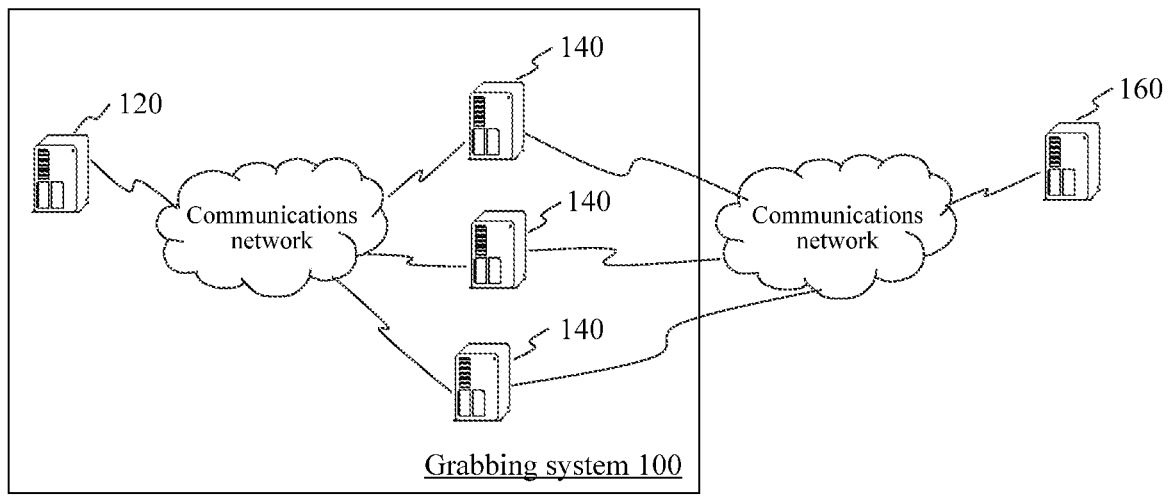
FIG. 1 is a schematic structural diagram of an implementation environment of a web page grabbing method according to an exemplary embodiment.

As the disclosure allows for various changes and numerous embodiments, exemplary embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, certain detailed explanations of the related art are omitted when it is deemed that they may unnecessarily obscure the essence of the disclosure.

Expressions such as "at least one of" when preceding a list of elements, modify the entire list of elements and do not modify the individual elements of the list While such terms as "first," "second," etc., may be used to describe various components, such components must not be limited to the above terms. The above terms are used only to distinguish one component from another.

The terms used in the embodiments are merely used to describe exemplary embodiments, and are not intended to limit the disclosure. An expression used in the singular encompasses the expression of the plural, unless it has a clearly different meaning in the context. In the specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The various actions, acts, blocks, steps, or the like in the flowchart or diagram in the drawings may be performed in the order presented, in a different order or simultaneously. Further, in some embodiments, some of the actions, acts, blocks, steps, or the like may be omitted, added, modified, skipped, or the like without departing from the scope of the disclosure.

Below, some terms used in the exemplary embodiments are explained.

Target web page: A target web page includes a web page corresponding to an H5 content (or H5 game content) and a web page corresponding to a non-H5 content (or non-H5 content). There may be one target web page or at least two target web pages. The exemplary embodiments do not limit a type of the target web page and a quantity of the target web pages. Hereinafter, a description will be made with respect to an example embodiment in which the H5 content is an H5 game content and the non-H5 content is a non-H5 game content. However, the disclosure is not limited to this example and can be applied to any other types of content.

Web page source code includes standard language code used to organize and typeset elements such as words, pictures, music, videos, and links on a web page. The standard language code is generally hyper text mark-up language (HTML) code, or may combine cascading style sheet (CSS) code or JavaScript (JS) code, or the like. For example, when a target web page is an HTML file, web page source code corresponding to the HTML file is HTML source code.

A web page corresponding to an H5 game is a game web page running on a web end of an electronic device.

Game details information includes introductive information corresponding to an H5 game on a web page corresponding to the H5 game.

The game details information includes at least one of a game name, a game icon, a game running picture, game details, a game running address, and a game type.

Communication time between servers includes time consumed by each stage from when a server sends a HyperText Transfer Protocol (HTTP) request to when the server obtains an HTTP response from another server. Shorter communication time indicates better network status and a faster network access speed.

The communication time includes connection time, request sending time, response waiting time, and data receiving time.

The connection time is a time period of establishing a communication connection between one server and another server, the request sending time is a time period of sending, by one server, an HTTP request to another server, the response waiting time is a time period of waiting for an HTTP response result by a server, and the data receiving time is a time period of receiving, by one server, an HTTP response result sent by another server.

FIG. 1 is a schematic structural diagram of an implementation environment of a web page grabbing method according to an exemplary embodiment.

The implementation environment according to an exemplary embodiment includes a grabbing system 100 and a game server 160. The grabbing system 100 includes an analysis server 120 and n grabbing servers 140, where n is an integer greater than 1.

The analysis server 120 is configured to obtain communication time between the n grabbing servers 140 and the game server 160.

Because shorter communication time between the grabbing servers 140 and the game server 160 indicates better network status, and indicates a faster network speed when the grabbing servers 140 access the game server 160, the analysis server 120 is further configured to determine a grabbing server 140 having shortest communication time as a grabbing server 140 (or a grabbing server 140 to be currently used).

It should be noted that the connection time may be determined as the communication time between the grabbing servers 140 and the game server 160. This embodiment does not limit a manner of determining the communication time.

The analysis server 120 may be one server, or a server cluster including a plurality of servers, or a cloud computing service center.

The analysis server 120 is connected to the grabbing servers 140 by using a communications network. In an exemplary embodiment, the communications network is a wired network and/or a wireless network.

The analysis server 120 is configured to interact with the grabbing servers 140 to determine the currently used grabbing server 140.

The grabbing server 140 may be one server, or a server cluster including several servers, or a cloud computing service center. The grabbing servers 140 may be individually disposed, or may be disposed by an Internet service provider (ISP).

The grabbing server 140 is configured to interact with the game server 160, to grab a web page on the game server 160.

According to different ISPs and different locations of the game server 160, multiple grabbing servers 140 may be deployed in one network environment, and each grabbing server 140 corresponds to one region and/or one ISP.

During network access, cross-region and/or cross-network website access causes a very large network delay, leading to long communication time. For example, if a website deployed in an equipment room of a service provider B is accessed from a server in an equipment room of a service provider A, a delay caused by cross-network access may increase from a level of microsecond to a level of second. Even if a website deployed in an equipment room of the service provider A is accessed from another equipment room of the service provider A, time consumption may increase if an inappropriate IP is selected. As can be learned, cross-region and/or cross-network access usually causes slow network access, in other words, long communication time. Therefore, in an exemplary embodiment, a target grabbing server having shortest time of accessing the game server 160 and the game server 160 should belong to a same ISP in a same location, so that access performed by the target grabbing server to the game server 160 does not belong to cross-region and cross-network access, and a network access speed is fast, in other words, communication time is short.

The grabbing servers 140 are connected to the game server 160 by using a communications network. In an exemplary embodiment, the communications network is a wired network or a wireless network.

Usually, the analysis server 120 obtains the communication time between the n grabbing servers 140 and the game server 160, and the analysis server 120 determines the grabbing server 140 with the shortest communication time as the currently used grabbing server 140. Then, the grabbing server 140 grabs a target web page on the game server 160, and the analysis server 120 is further configured to analyze the grabbed web page.

In an exemplary embodiment, the wireless network or wired network uses a standard communications technology and/or protocol. The network may be Internet, or alternatively be any network, including, for example but not limited to, a local area network (LAN), a metropolitan area network (MAN), a wide area network (WAN), a mobile network, a wired or wireless network, a private network or a virtual private network (VPN), and/or any combination thereof. In some embodiments, a technology and/or format including HTML, extensible markup language (XML), and the like are used to represent data exchanged by using a network. In addition, a normal encryption technology such as a secure socket layer (SSL), transport layer security (TLS), a VPN, or an Internet Protocol security (IPsec) may be further used to encrypt all or some links. In some other exemplary embodiments, a customized and/or private data communications technology may further be used to replace or supplement the data communications technology.

In an exemplary embodiment, in a process of grabbing the target web page on the game server 160, the grabbing server 140 sets an initial value of a Transmission Control Protocol (TCP) congestion window (CWnd) as a preset threshold. The preset threshold is an upper limit empirical value for receiving the grabbed target web page.

Figure 2:
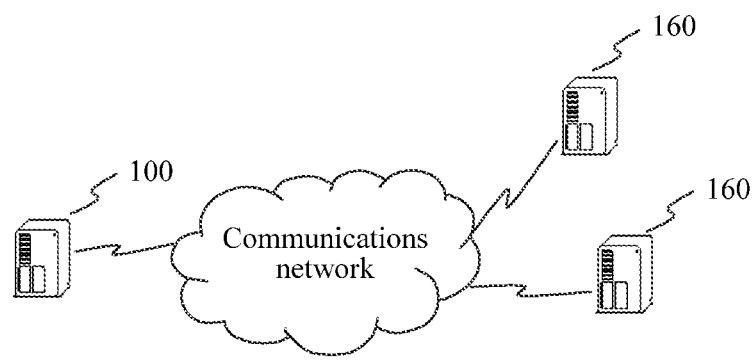
FIG. 2 is a schematic structural diagram of implementation environment of a web page grabbing method according to another exemplary embodiment.

FIG. 2 is a schematic structural diagram of another implementation environment of a web page grabbing method according to an exemplary embodiment. The implementation environment according to an exemplary embodiment includes a grabbing system 100 and n game servers 160, wherein n is an integer greater than 1.

The n game servers 160 may be disposed for a same game website. Only two game servers 160 are exemplarily shown in the figure. This embodiment does not limit a value of n.

The grabbing system 100 is configured to obtain time of communication with the n game servers 160 corresponding to the game website.

Because shorter communication time between the grabbing system 100 and the game servers 160 indicates better network status and a fast connection speed between the grabbing system 100 and the game servers 160, the grabbing system 100 is further configured to determine a game server 160 having shortest communication time as a game server 160 for current grabbing. The communication time includes connection time, request sending time, response waiting time, and data receiving time.

It should be noted that because the connection time can accurately reflect network status in a connection establishment process, the grabbing system 100 may further determine the connection time as the communication time between the grabbing system 100 and the game servers 160. This embodiment does not limit a scope for determining the communication time.

The grabbing system 100 may be one server, or a server cluster including several servers, or a cloud computing service center.

The grabbing system 100 is configured to interact with the n game servers 160 corresponding to the game website, to grab a target web page on the game website. The grabbing system 100 may be individually disposed, or may be disposed by an ISP.

A same game website usually corresponds to multiple game servers 160. In this way, a user may select, according to different ISPs and different locations, a game server 160 corresponding to an ISP and a location. Therefore, one game server 160 corresponds to one ISP in one location.

In an exemplary embodiment, after grabbing the target web page on the game website, the grabbing system 100 sets an initial value of a TCP CWnd as a preset threshold. The preset threshold is an upper limit empirical value for receiving the grabbed target web page.

Figure 3:
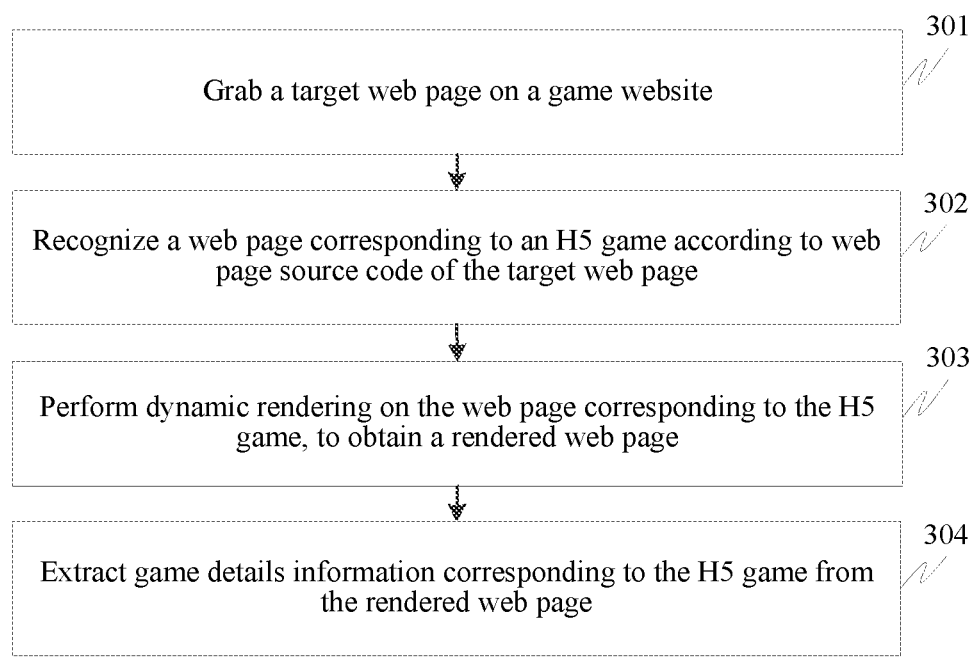
FIG. 3 is a flowchart of a web page grabbing method according to an exemplary embodiment.

FIG. 3 is a flowchart of a web page grabbing method according to an exemplary embodiment. This embodiment is described by using an example in which the web page grabbing method is applied to the implementation environment shown in FIG. 1 or FIG. 2. The web page grabbing method includes the following operations.

Operation 301: Grab a target web page on a game website.

The game website usually is preset by a website administrator. There may be one game website, or at least two game websites. This embodiment is described by using an example in which there is one game website.

In an exemplary embodiment, a grabbing server grabs the target web page on the game website. The target web page includes a web page corresponding to an H5 game and a web page corresponding to a non-H5 game.

In an exemplary embodiment, the grabbing server grabs several target web pages on the game website through Internet by using a web crawler. A basic working process of the web crawler is as follows: 1) obtain a selected seed uniform resource locator (URL); 2) place the seed URL into a to-be-grabbed URL queue; 3) sequentially extract a to-be-grabbed URL from the to-be-grabbed URL queue, parse the to-be-grabbed URL, and obtain a web page corresponding to the to-be-grabbed URL from a corresponding host; 4) place the grabbed URL into a grabbed URL queue; 5) analyze a URL in the grabbed URL queue, to obtain another URL, place the obtained another URL into the to-be-grabbed URL queue, and enter a next cycle. In addition, a format of the target web page grabbed by the web crawler usually is an HTML format.

Operation 302: Recognize the web page corresponding to the H5 game according to web page source code of the target web page.

The grabbing server recognizes the web page corresponding to the H5 game according to the web page source code of the target web page. The recognized web page corresponding to the H5 game is used as a web page to be analyzed in the subsequent operations.

After grabbing the target web page on the game website, the grabbing server extracts the web page source code from the target web page. For example, when the target web page is an HTML file, HTML source code is extracted from the HTML file.

It should be noted that the web crawler usually sequentially grabs a target web page according to a sequence of to-be-grabbed URLs in a to-be-grabbed URL queue. When there are multiple target web pages, the grabbing server may sequentially extract web page source code form the web pages, or may extract web page source code from the multiple web pages at the same time. This is not limited in this embodiment.

Operation 303. Perform dynamic rendering on the web page corresponding to the H5 game, to obtain a rendered web page.

The web page corresponding to the H5 game usually includes CSS code or JS code. The page needs to be rendered to obtain a real web page, and before rendering, some information cannot be extracted, for example, an animation material needing to be generated dynamically or a picture material.

In an exemplary embodiment, the dynamic rendering performed by the grabbing server on the web page corresponding to the H5 game, to obtain the rendered web page includes the following operations:

1. The grabbing server extracts JavaScript (JS) information in the web page corresponding to the H5 game.

For example, the web page source code is HTML code. Usually, the JS information is added to the HTML code by using one of the following two manners: (1) Directly embed JS code into the HTML code; and (2) Place JS code into an external file, and cite the external file in the HTML code.

According to the foregoing two manners, the JS information in the HTML code may be extracted by querying a tag <script> in the web page source code. The extraction method includes the following operations:

(1) The grabbing server queries a JS tag in the web page source code.

(2) The grabbing server determines a type of the JS information tagged by the JS, and if the JS information is JS code, performs operation (3), or if the JS information is a JS file, performs operation (4).

(3) The grabbing server extracts JS code located between a pair of JS tags.

(4) The grabbing server extracts a storage path and a file name of the JS file.

For a segment of HTML code, after the foregoing operations are performed and all nodes tagged by <script> are traversed, several segments of JS code are obtained, and/or several JS files and storage paths thereof are obtained. All extracted JS code may be stored in a temporary .JS file.

2. The grabbing server parses the JS information, and determines that web page source code of the web page corresponding to the H5 game includes a preset function.

All JS files cited in the web page source code include two categories. A first category is a JS framework file, and this category of file generally has a fixed file name, for example, prototype.js. A second category is a non-JS framework file. In a segment of web page source code, the preset function is defined in the non-JS framework file. Therefore, no further parsing needs to be performed on content of the JS framework file, but an eigenvalue corresponding to a framework type of the JS framework file may be found according to a file name of the JS framework file, and the preset function defined in the non-JS framework file may be found according to the eigenvalue. Further, the preset function in the web page source code may be found. The method includes but is not limited to the following operations:

(1) The grabbing server determines a JS file type according to a JS file name.

It is determined, according to the foregoing method, whether the JS file is a framework file or a non-framework file.

(2) If the JS file is a framework file, the grabbing server obtains a corresponding eigenvalue.

(3) The grabbing server determines, according to the eigenvalue, a preset function defined in the non-JS framework.

The preset function in the JS file includes a segment of particular code, referred to as an eigenvalue. Therefore, it may be determined, according to whether the function in the JS file includes the eigenvalue, whether the function is the preset function.

3. The grabbing servers execute the determined preset function to obtain the rendered web page.

In an exemplary embodiment, the grabbing server directly performs dynamic rendering on the web page corresponding to the H5 game, to obtain the rendered web page.

In an exemplary embodiment, the rendering process is merely an exemplary description. The rendering process may include various different implementations according to different code types included in the web page.

Operation 304. Extract game details information corresponding to the H5 game from the rendered web page.

In an exemplary embodiment, the grabbing server extracts the game details information corresponding to the H5 game from the rendered web page.

The game details information includes at least one of a game name, a game icon, a game running picture, game details, a game running address, and a game type.

In an exemplary embodiment, the grabbing server stores the grabbed game name and game details information in an association manner.

Accordingly, in an exemplary embodiment, the target web page on the game website is grabbed, the web page corresponding to the H5 game is recognized according to the web page source code of the target web page, dynamic rendering is performed on the web page corresponding to the H5 game, to obtain the rendered web page, and the game details information corresponding to the H5 game is extracted from the rendered web page, so that the server can accurately recognize the web page corresponding to the H5 game according to source code of the web page, and extract the game details information from the web page, thereby solving the problem that a large amount of manual work is needed to perform screening and information extraction on a grabbing result in the related art technology. Therefore, according to an exemplary embodiment, the accuracy of recognizing, by the server, the web page corresponding to the H5 game is improved, and the efficiency of extracting, by the server, the game details information is improved.

In an exemplary embodiment, before operation 401, the method further includes the following operations.

1. An analysis server obtains communication time between n grabbing servers and the game website, where n is an integer greater than 1.

2. The analysis server determines a grabbing server having shortest communication time as a currently used grabbing server.

For example, an ISP of the game website is a service provider A, and a region in which the game website is located is Beijing, China. First, the analysis server obtains communication time between three grabbing servers and the game website. For example, a first grabbing server is a grabbing server of the service provider A in Beijing, and communication time between the first grabbing server and the game website is 0.1 ms; a second grabbing server is a grabbing server of a service provider B in Beijing, and communication time between the second grabbing sever and the game website is 0.5 ms; and a third grabbing server is a grabbing server of a service provider C in Shanghai, China, and communication time between the third grabbing server and the game website is 0.2 s. In this example, the analysis server determines the first grabbing server as the currently used grabbing server based on the shortest communication time corresponding to the first grabbing server.

3. The grabbing server obtains time of communication with n game servers corresponding to the game website.

4. The grabbing server determines a game server having shortest communication time as a game server for current grabbing.

For example, the ISP of the game website is the service provider A, and the region in which the game website is located is Beijing. First, the grabbing server obtains time of communication with three game servers corresponding to the game website. For example, time of communication with a first game server is 0.1 ms; time of communication with a second game server is 0.3 ms; and time of communication with a third game server is 0.8 ms. In this example, the analysis server determines the first game server as the game server for current grabbing.

5. The grabbing server sets an initial value of a TCP CWnd as a preset threshold, where the preset threshold is an upper limit empirical value for receiving the grabbed target web page.

In an exemplary embodiment, the grabbing server sets a larger initial value for the TCP CWnd, so that when a target web page is received, all data of the target web page can be transmitted at a time, thereby reducing transmission time.

The TCP is a transport layer protocol in the Transmission Control Protocol/Internet Protocol (TCP/IP) stack. The CWnd controls, by using a window size of the grabbing server, a rate of sending data by the game website.

In an exemplary embodiment, a method of setting the initial value of the TCP CWnd as the preset threshold includes the following operations: When receiving request information of a client for accessing a web page, the grabbing server obtains a maximum packet length (or Maximum Segment Size, MSS) and the initial value of the CWnd; calculates a ratio of the initial value of the CWnd to the maximum packet length, to obtain a first parameter; compares the first parameter and a second parameter; and if the first parameter is less than the second parameter, uses a product of the second parameter and the maximum packet length as an adjusted initial value of the CWnd, e.g., as the preset threshold.

In an exemplary embodiment, the second parameter is preset. Exemplarily, the second parameter is set to 10. In an exemplary embodiment, the second parameter is determined according to current bandwidth utilization. This embodiment does not limit a value of the second parameter.

For example, the first parameter is 3, the second parameter is 10, and the MSS is used to represent the maximum packet length. Then, the initial value of the CWnd is 3×MSS, and the adjusted initial value of the CWnd is 10×MSS.

In an exemplary embodiment, the grabbing server establishes a connection to the game website in a pre-connection manner. In other words, before the target web page on the game website is grabbed, the grabbing server pre-establishes a connection to the game server.

It should be noted that operation 5 and operations 3 and 4 may be performed in parallel. This is not limited in this embodiment.

Figure 4:
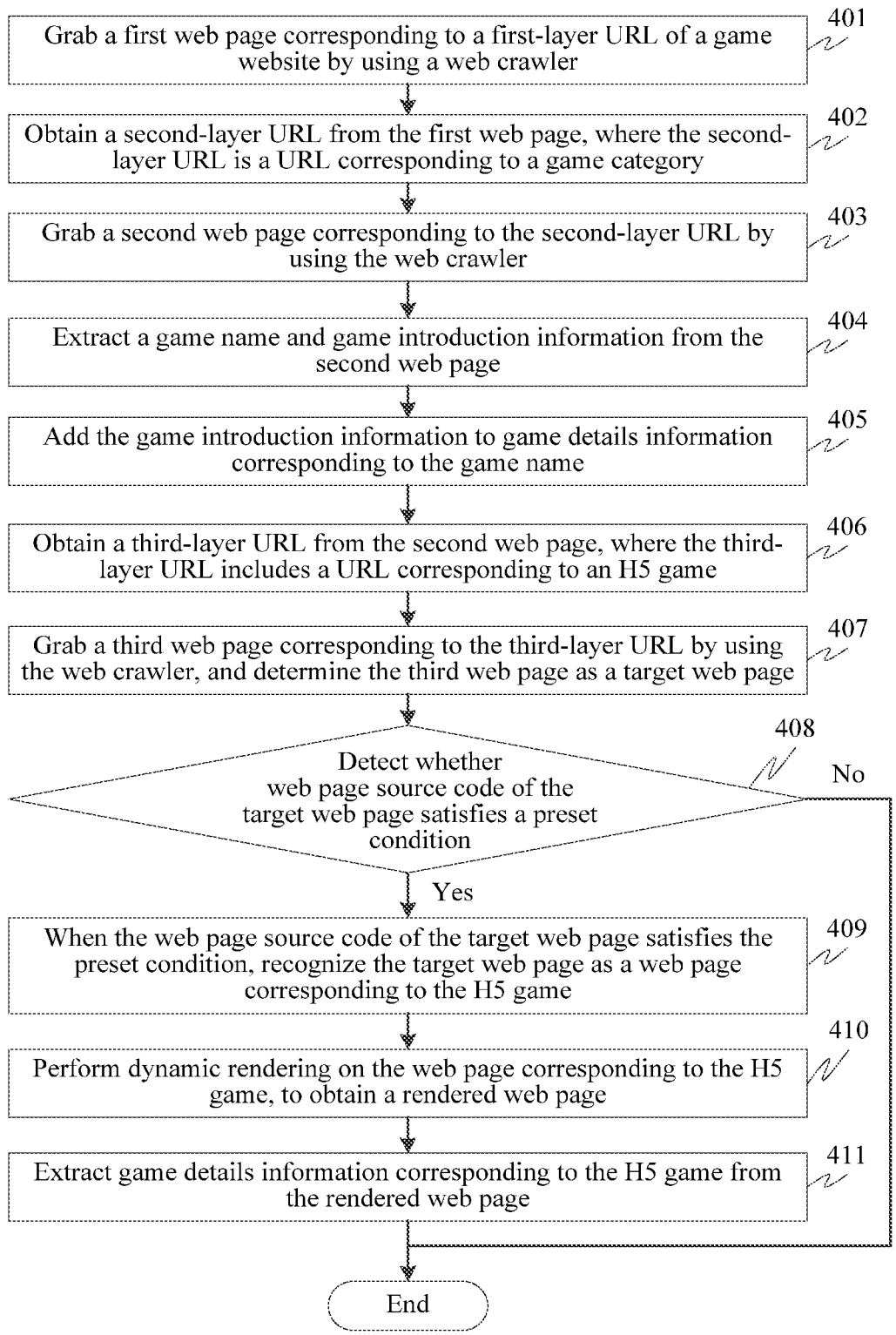
FIG. 4 is a flowchart of a web page grabbing method according to another exemplary embodiment.
Figure 5A:
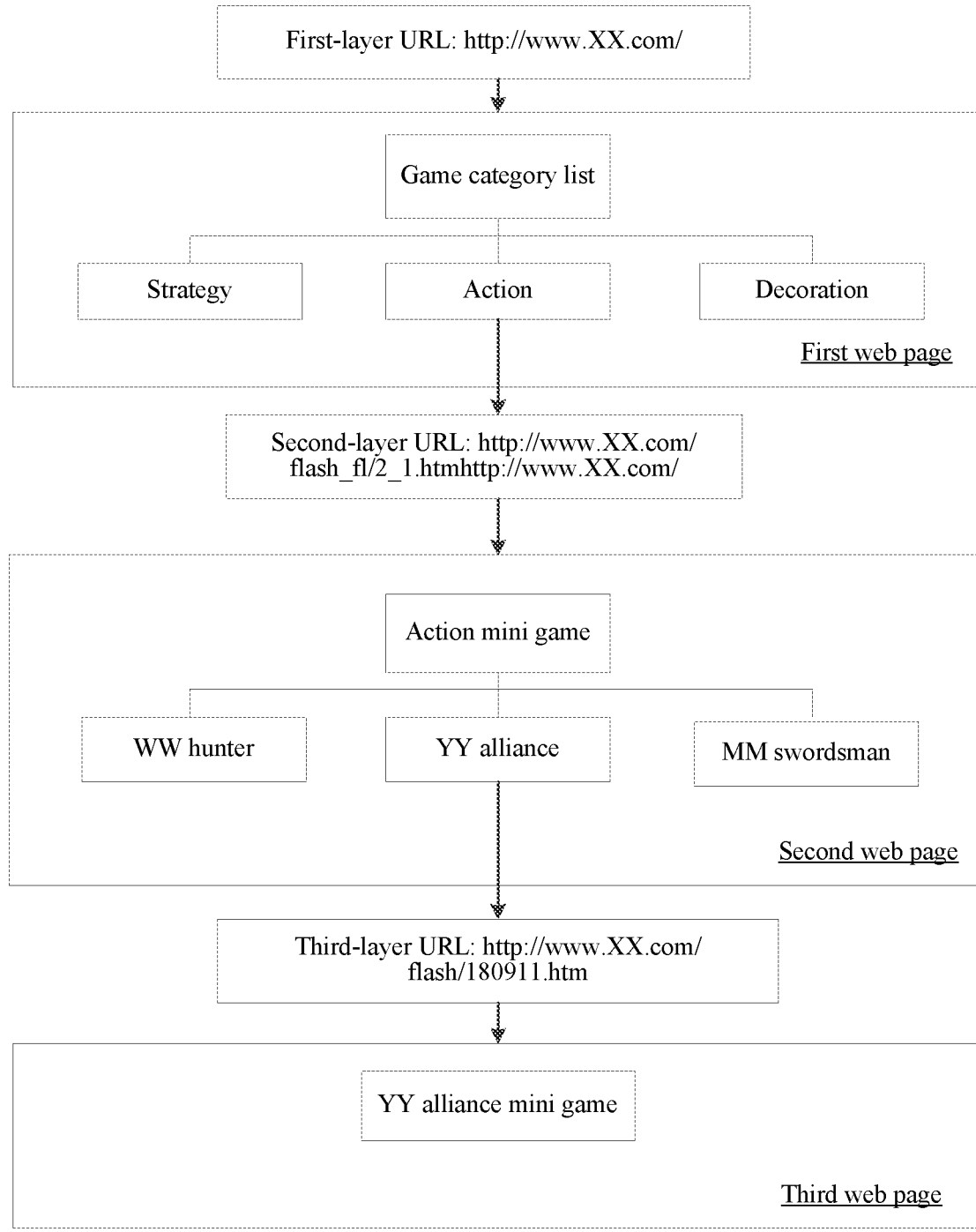
FIG. 5A is a diagram illustrating a web page grabbing method according to an exemplary embodiment.

FIG. 4 is a flowchart of a web page grabbing method according to another exemplary embodiment, and FIG. 5A is a diagram illustrating a web page grabbing method according to an exemplary embodiment.

An exemplary embodiment shown in FIG. 4 is described by using an example in which the web page grabbing method is applied to the implementation environment shown in FIG. 1 or FIG. 2. The web page grabbing method according to an exemplary embodiment includes the following operations.

Operation 401. A grabbing server grabs a first web page corresponding to a first-layer URL of a game website by using a web crawler.

In an example, referring to FIG. 5A, the game website is "XX mini game", and a first-layer URL of the game website is "http://www.XX.com/". The grabbing server grabs a first web page "game category list" corresponding to the first-layer URL by using the web crawler. The game category list includes "strategy", "action", and "decoration".

Operation 402. The grabbing server obtains a second-layer URL from the first web page, where the second-layer URL is a URL corresponding to a game category.

Exemplarily, as shown in FIG. 5A, the grabbing server obtains the second-layer URL from the first web page, e.g., a URL "http://www.XX.com/flash_f1/2_1.htm" corresponding to the game category "action".

Operation 403. The grabbing server grabs a second web page corresponding to the second-layer URL by using the web crawler.

Exemplary, as shown in FIG. 5A, the grabbing server grabs the second web page "action mini game" corresponding to the second-layer URL by using the web crawler. The second web page includes a game name "WW hunter", a game name "YY alliance", and a game name "MM fight swordsman".

Each game corresponds to one game name and one piece of game introduction information. For example, the game "YY alliance" includes a game name "YY alliance" and game introduction information "beat the enemy twice; the gates of the strongpoints will be open one minute later, and players having energy balls win after returning the energy balls to respective strongpoints".

Operation 404. The grabbing server extracts a game name and game introduction information from the second web page.

Exemplarily, the grabbing server extracts the game name "YY alliance" and the game introduction information "beat the enemy twice; the gates of the strongpoints will be open one minute later, and players having energy balls win after returning the energy balls to respective strongpoints" from the second web page.

Operation 405. The grabbing server adds the game introduction information to game details information corresponding to the game name.

Exemplarily, the grabbing server adds the game introduction information "beat the enemy twice; the gates of the strongpoints will be open one minute later, and players having energy balls win after returning the energy balls to respective strongpoints" to game details information corresponding to the game name "YY alliance".

Operation 406. The grabbing server obtains a third-layer URL from the second web page, where the third-layer URL includes a URL corresponding to an H5 game.

Exemplarily, referring to FIG. 5A, the grabbing server obtains the third-layer URL from the second web page, e.g., a URL "http://www.XX.com/flash/180911.htm" corresponding to the game name "YY alliance".

Operation 407. The grabbing server grabs a third web page corresponding to the third-layer URL by using the web crawler, and determines the third web page as a target web page.

Exemplarily, as shown in 5A, the grabbing server grabs a third web page "YY alliance mini game" corresponding to the third-layer URL by using the web crawler, and determines the third web page as a target web page.

Operation 408. Detect whether web page source code of the target web page satisfies a preset condition.

In an exemplary embodiment, the grabbing server detects whether the web page source code of the target web page satisfies the preset condition, and when the web page source code of the target web page satisfies the preset condition, recognizes the target web page as a web page corresponding to the H5 game, or when the web page source code of the target web page does not satisfy the preset condition, the process ends.

The preset condition includes a condition that a theme name corresponding to the web page source code of the target web page matches a preset game key word; and/or a condition that the web page source code of the target web page carries code of using a preset rendering technology, where the preset rendering technology includes at least one of canvas and WebGL; and/or a condition that the web page source code of the target web page carries code corresponding to a preset game engine, where the preset game engine includes at least one of an Egret engine, a cocos2dx-js engine, a Game Maker Studio engine, a Construct 2 engine. However, these examples are described for illustrative purposes and the disclosure is not limited thereto.

In an exemplary embodiment, the preset condition includes N preset conditions, and N is a positive integer greater than 1.

Operation 408 includes but is not limited to the following operations.

Operation 1. The grabbing server detects whether the web page source code of the target web page satisfies an $i^{th}$ condition.

In an exemplary embodiment, a first condition is that a theme name of a web page matches a preset game key word; a second condition is that code of using a preset rendering technology is carried, where the preset rendering technology includes at least one of canvas and WebGL; a third condition is that code corresponding to a preset game engine is carried, where the preset game engine includes at least one of the Egret engine, the cocos2dx-js engine, the Game Maker Studio engine, the Construct 2 engine.

2. The grabbing server calculates, by using the following formula, a probability value that the web page source code is the web page corresponding to the H5 game:

$$y = \sum_{i=1}^{N} a_i b_i$$

where y represents the probability value, $a_i$ represents a weighting value corresponding to the $i^{th}$ condition, and when the web page source code satisfies the $i^{th}$ condition, a value of $b_i$ is a preset value greater than 0, or when the web page source code does not satisfy the $i^{th}$ condition, a value of $b_i$ is 0, $1 \leq n \leq N$, and N is a quantity of the preset conditions; exemplarily, the preset value is 1.

In an exemplary embodiment, a weighting value $a_1$ corresponding to the first condition is set to 0.4, a weight value $a_2$ corresponding to the second condition is set to 0.3, and a weighting value $a_3$ corresponding to the third condition is set to 0.3. When the grabbing server detects that the web page source code of the target web page satisfies the first condition and the second condition, the grabbing server calculates, according to a detection result and the formula, the probability value that the web page source code is the web page corresponding to the H5 game as 0.7.

3. The grabbing server detects whether the probability value is greater than a preset threshold.

In an exemplary embodiment, the grabbing server sets the preset threshold to 0.5. When the calculated probability value is 0.7, the grabbing server detects that the probability value is greater than the preset threshold.

4. If the probability value is greater than the preset threshold, the grabbing server determines that the web page source code satisfies the preset condition.

Operation 409. When the web page source code of the target web page satisfies the preset condition, recognize the target web page as the web page corresponding to the H5 game.

If the probability value is greater than the preset threshold, the grabbing server determines that the web page source code satisfies the preset condition, and recognizes the target web page as the web page corresponding to the H5 game.

In an exemplary embodiment, before grabbing the target web page on the game website, the grabbing server determines whether a problem occurs in running status of the game website, and if no problem occurs, the grabbing server grabs the target web page on the game website.

Exemplarily, determining, by the analysis server, the running status of the game website includes the following operations: First, the analysis server determines whether a domain name of the game website is registered, and if the domain name is not registered, the analysis server determines that a problem occurs in the running status of the game website; Also, the analysis server determines whether an IP address of the game website is successfully parsed, and if the IP address is not successfully parsed, determines that the problem occurs in the running status of the game website; Further, the analysis server requests the game website to obtain an HTTP status code and response time, determines whether the HTTP status code is equal to 200, and if the HTTP status code is not equal to 200, determines that the problem occurs in the running status of the game website; Further, the analysis server determines whether the response time of the game website is greater than 10 seconds, and if the response time is greater than 10 seconds, determines that the problem occurs in the running status of the game website. However, these examples are described for illustrative purposes and the disclosure is not limited thereto.

In an exemplary embodiment, the grabbing server reports central processing unit (CPU) utilization to the analysis server every preset time, and when the CPU utilization exceeds a normal value, in other words, the grabbing server is to be overloaded, the analysis server reduces load of the grabbing server.

In an exemplary embodiment, according to different locations and different ISPs, different domain name system (DNS) master servers and backup servers are preconfigured. When a success rate of a DNS master server calculated by the grabbing server is greater than or equal to that of a DNS backup server, the DNS server is switched to the DNS master server; when a calculated success rate of a DNS master server is less than that of a DNS backup server, a DNS server currently providing a service is switched from the DNS master server to the DNS backup server; or when both a calculated success rate of a DNS master server and a calculated success rate of a DNS backup server are less than a preset threshold, a DNS server currently providing a service is switched from the DNS master server to a level-2 DNS backup server.

Operation 410. Perform dynamic rendering on the web page corresponding to the H5 game, to obtain a rendered web page.

For related details that the grabbing server performs dynamic rendering on the web page corresponding to the H5 game, to obtain the rendered web page, refer to the operation related to rendering in the method embodiment, and details are not described herein again.

Operation 411. Extract game details information corresponding to the H5 game from the rendered web page.

A manner in which the grabbing server extracts the game details information corresponding to the H5 game from the rendered web page includes but is not limited to the following exemplary embodiments.

In an exemplary embodiment, the grabbing server collects web page data matching a preset data collection rule in the rendered web page according to the data collection rule, and performs data mining on the web page data, to obtain the game details information corresponding to the H5 game.

In another exemplary embodiment, the grabbing server extracts, according to a pre-trained machine learning model, the game details information corresponding to the H5 game from the rendered web page by using the machine learning model.

In still another exemplary embodiments, the grabbing server performs visual analysis on the rendered web page, detects whether the rendered web page includes the game details information corresponding to the H5 game, and when the rendered web page includes the game details information corresponding to the H5 game, separates the game details information corresponding to the H5 game and a background image of the rendered web page according to an analytical result of the visual analysis, to extract the game details information corresponding to the H5 game.

In still another exemplary embodiment, the grabbing server constructs a document object model (DOM) tree structure of the target web page by using a DOM tree technology, and extracts the game details information corresponding to the H5 game from the rendered web page according to the DOM tree structure.

It should be noted that any two or more of exemplary embodiments may be combined for implementation, which is easily understood by a person skilled in the art. A manner of combining any two or more of the exemplary embodiments is not repeated herein.

A description of an exemplary embodiment is provided by using an example in which the grabbing server extracts the game details information corresponding to the H5 game from the rendered web page by using a DOM tree structure, and a process according to an exemplary embodiment includes but is not limited to the following several operations.

1. The grabbing server constructs a DOM structure of the rendered target web page according to the web page source code, where a DOM tree structure includes one or more nodes.

For example, a format of the target web page grabbed by the web crawler is an HTML format. The web page source code is parsed, so that the DOM tree structure of the target web page may be constructed by using the DOM technology, and the DOM tree structure of the target web page may include one or more nodes.

In an exemplary embodiment, a node is automatically selected from a DOM tree according to a preset algorithm. In an exemplary embodiment, a node is manually selected by using a human-computer interface.

2. The grabbing server obtains at least one template of the game website, where the template is of the DOM tree structure.

Because same types of web pages of the game website have similar structures, one or more corresponding templates may be constructed for one type of web pages. Exemplarily, types of web pages of the game website include a web page related to game category information, a web page related to game introduction information, and a web page related to game details information.

The grabbing server constructs a DOM tree structure for a particular type of web pages by using the DOM technology, to form a template for this type of web pages.

The template includes path information of one or more nodes in the corresponding DOM tree structure. The path information of the node includes information about a path from a root node of the DOM tree structure to the node, or the path information of the node includes attribute information of a node through which a path from a root node to the node needs to pass.

Exemplarily, the attribute information of the node includes a name (for example, a tag), a sequence number, and the like of the node. The sequence number indicates a location of the node in a corresponding DOM tree structure, or the sequence number indicates a location of the node on a layer of the corresponding DOM tree structure.

In an exemplary embodiment, the template is constructed for the game website, and includes path information of the following content in the game website: a game name, a game icon, a game running picture, game details, a game running address, a game type, and the like. In an actual application, the content may be selected according to a need, and this is not limited in this embodiment.

In an exemplary embodiment, the constructed template is in an extensible markup language (XML) file format. The path information of the game details information in the template includes a character string. The character string includes a structure array identifying level structures of a DOM tree, and the structure array includes attribute information such as a name (for example, a tag) and a sequence number of a node.

Exemplarily, sequence numbers of nodes start from zero, and each sequence number points to a node corresponding to a value of the sequence number plus one.

3. The grabbing server selects the path information of the game details information from the template, and performs matching between the path information of the game details information and each node in the DOM tree structure.

The grabbing server traverses the DOM tree structure of the rendered web page, performs matching between the path information of the game details information and each node in the DOM tree structure, and returns a location of the last matched node in the path information in the DOM tree structure.

4. If the matching succeeds, the grabbing server extracts the game details information corresponding to the path information from the rendered web page.

After extracting the game details information, the grabbing server stores the game details information.

It should be noted that when a URL is a dead link, e.g., a web link in a website is in a path unreachable state, the grabbing server stops the web page grabbing method according to an HTTP return code. When information on the target web page on the game website is updated, extraction logic of extracting the game details information corresponding to the H5 game from the rendered web page may be re-defined by configuring a page extraction template configuration interface, and the web page grabbing method is re-performed according to the re-defined extraction logic.

It should be further noted that because the grabbing server extracts the game name and the game introduction information from the second-layer web page, and extracts other game details information such as the game name, the game icon, the game running picture, the game details, the game running address, and the game type from the third-layer web page (e.g., the target web page) in operation 404, the grabbing server stores, into a same group of game details information, the information such as the game name, the game introduction information, the game name, the game icon, the game running picture, the game details, the game running address, and the game type that are separately extracted.

Accordingly, in an exemplary embodiment, a certain condition is preset, and when the web page source code of the target web page satisfies the preset condition, the target web page is recognized as the web page corresponding to the H5 game, so that the grabbing server can recognize the web page corresponding to the H5 game according to the preset condition, thereby effectively and accurately recognizing the web page corresponding to the H5 game.

Figure 5B:
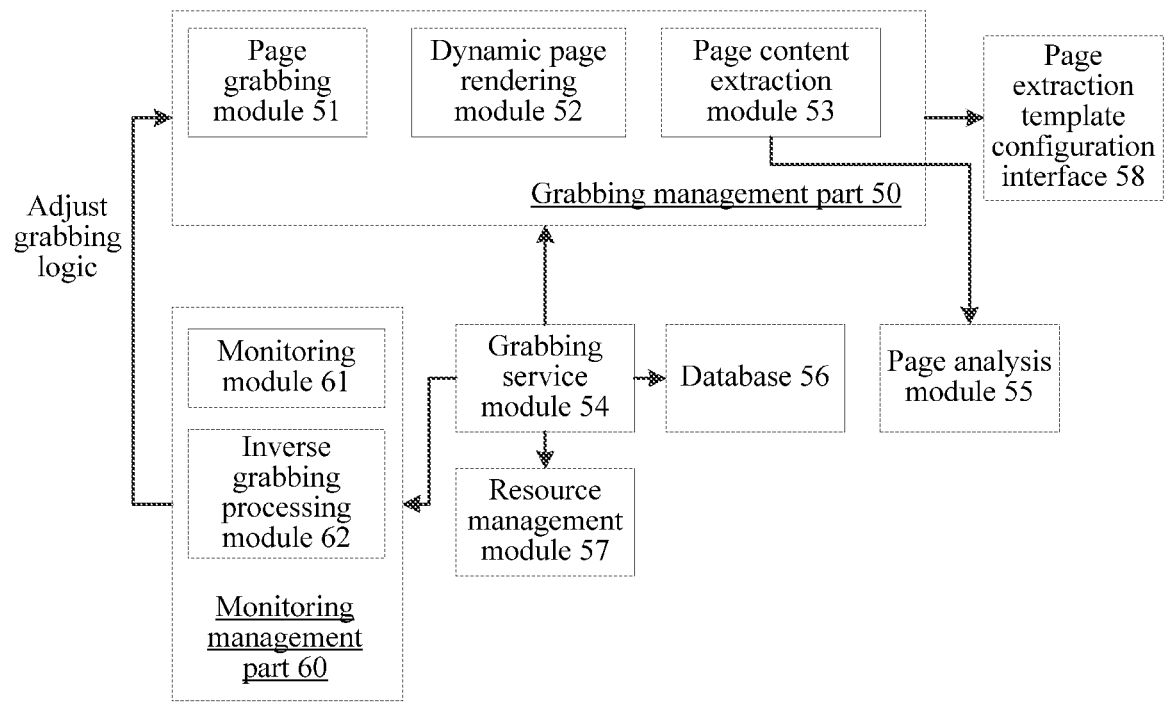
FIG. 5B is a diagram illustrating a web page grabbing method according to another exemplary embodiment.
Figure 5C:
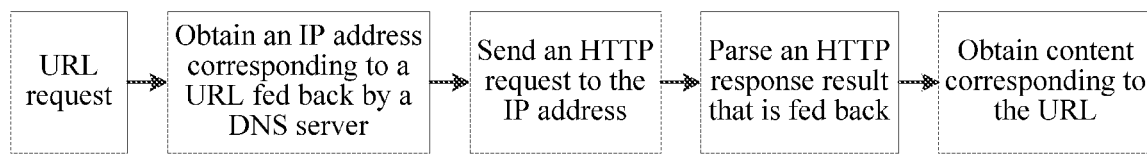
FIG. 5C is a flowchart illustrating a web page grabbing method according to another exemplary embodiment.

FIG. 5B is a diagram illustrating a web page grabbing method according to another exemplary embodiment. FIG. 5C is a flowchart illustrating a web page grabbing method according to another exemplary embodiment.

The grabbing system mainly includes two parts: a grabbing management part 50 and a monitoring management part 60.

The grabbing management part 50 includes a page grabbing module 51, a dynamic page rendering module 52, and a page content extraction module 53.

The monitoring management part 60 includes a monitoring module 61 and an inverse grabbing processing module 62.

The grabbing service module 54 grabs a target web page on a game website by using the page grabbing module 51, and recognizes a web page corresponding to an H5 game according to web page source code of the target web page. The grabbing service module 54 performs dynamic rendering on the web page corresponding to the H5 game by using the dynamic page rendering module 52, to obtain a rendered web page. The grabbing service module 54 extracts game details information corresponding to the H5 game from the rendered web page by using the page content extraction module 53.

The page content extraction module 53 first obtains, through analysis by using the page analysis module 55, various messages of the rendered web page, and then, extracts the game details information corresponding to the H5 game from the various messages obtained through analysis. The grabbing service module 54 stores the extracted game details information into a database 56.

Before the target web page on the game website is grabbed, a resource management module 57 determines a currently used grabbing server and a game server for current grabbing. When information on the target web page on the game website is updated, extraction logic of extracting the game details information corresponding to the H5 game from the rendered web page may be re-defined by configuring a page extraction template configuration interface 58, and the web page grabbing method is re-performed according to the re-defined extraction logic.

The monitoring module 61 is configured to monitor whether the target web page grabbed by the grabbing service module 54 is a web page of the game website, and if the target web page is not the web page of the game website, the monitoring module 61 sends a grabbing failure instruction to the grabbing management part 50. After receiving the grabbing failure instruction, the grabbing management part 50 adjusts grabbing logic, and re-grabs a target web page. The inverse grabbing processing module 62 is configured to grab a target web page in another server accessing the grabbing service module 54.

In an exemplary embodiment, a method of grabbing, by the grabbing service module 54, the target web page on the game website includes the following operations: Referring to FIG. 5C, first, the grabbing service module 54 obtains a URL request, and sends the URL to a DNS server; then, the grabbing service module 54 obtains an IP address corresponding to a URL fed back by the DNS server; subsequently, the grabbing service module 54 sends an HTTP request to the IP address; next, the grabbing service module 54 receives and parses a HTTP response result that is fed back, to obtain content corresponding to the URL, e.g., the web page source code of the target web page.

Below, provided is a description of an exemplary embodiment of a web page grabbing apparatus that may be used to implement the web page grabbing method according to exemplary embodiments. Repetitive descriptions will be omitted.

Figure 6:
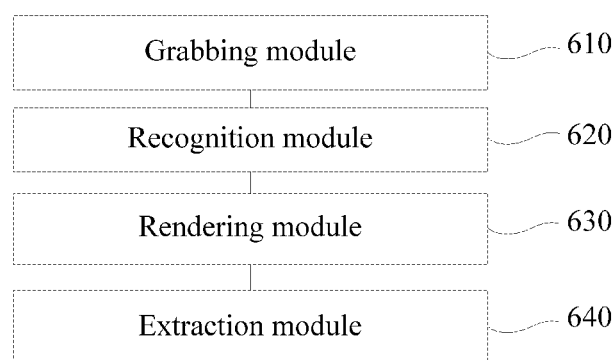
FIG. 6 is a structural diagram of a web page grabbing apparatus according to an exemplary embodiment.

FIG. 6 is a schematic structural diagram of a web page grabbing apparatus according to an exemplary embodiment. The web page grabbing apparatus according to an exemplary embodiment may be implemented as all or a part of the grabbing system in FIG. 1 or FIG. 2 by using a dedicated hardware circuit, or a combination of software and hardware. The web page grabbing apparatus may include: a grabbing module 610, configured to grab a target web page on a game website, the target web page including a web page corresponding to an H5 game and a web page corresponding to a non-H5 game; a recognition module 620, configured to recognize the web page corresponding to the H5 game according to web page source code of the target web page; a rendering module 630, configured to perform dynamic rendering on the web page corresponding to the H5 game, to obtain a rendered web page; and an extraction module 640, configured to extract game details information corresponding to the H5 game from the rendered web page.

Accordingly, in an exemplary embodiment, the target web page on the game website is grabbed, the web page corresponding to the H5 game is recognized according to the web page source code of the target web page, dynamic rendering is performed on the web page corresponding to the H5 game, to obtain the rendered web page, and the game details information corresponding to the H5 game is extracted from the rendered web page, so that the server can accurately recognize the web page corresponding to the H5 game according to source code of the web page, and extract the game details information from the web page, thereby solving the problem that a large amount of manual work is needed to perform screening and information extraction on a grabbing result. Therefore, the accuracy of recognizing, by the server, the web page corresponding to the H5 game is improved, and the efficiency of extracting the game details information by the server is improved.

Figure 7:
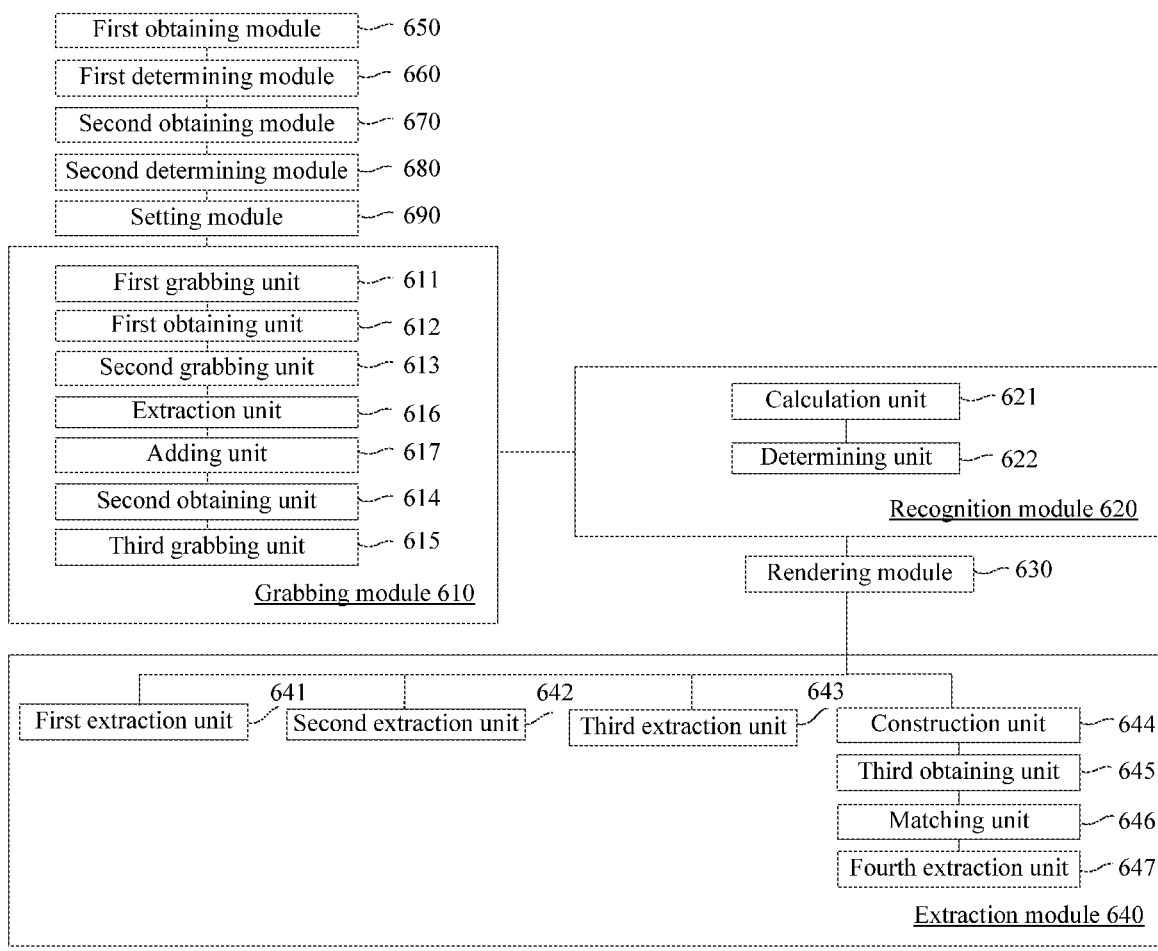
FIG. 7 is a structural diagram of a web page grabbing apparatus according to another exemplary embodiment.

FIG. 7 is a schematic structural diagram of a web page grabbing apparatus according to another exemplary embodiment. The web page grabbing apparatus may be implemented as all or a part of the grabbing system in FIG. 1 or FIG. 2 by using a dedicated hardware circuit, or a combination of software and hardware. Similar to the exemplary embodiment shown in FIG. 6, the web page grabbing apparatus according to an exemplary embodiment shown in FIG. 7 may include the grabbing module 610, the recognition module 620, the rendering module 630, and the extraction module 640.

The recognition module 620 is further configured to: when a theme name corresponding to the web page source code of the target web page matches a preset game key word, recognize the target web page as the web page corresponding to the H5 game.

The recognition module 620 is further configured to: when the web page source code of the target web page carries code of using a preset rendering technology, recognize the target web page as the web page corresponding to the H5 game.

The preset rendering technology includes at least one of canvas and WebGL.

The recognition module 620 is further configured to: when the web page source code of the target web page carries code corresponding to a preset game engine, recognize the target web page as the web page corresponding to the H5 game.

The preset game engine includes at least one of an Egret engine, a cocos2dx-js engine, a Game Maker Studio engine, and a Construct 2 engine.

The recognition module 620 includes a calculation unit 621 and a determining unit 622.

The calculation unit 621 is configured to calculate, by using the following formula, a probability value that the target web page is the web page corresponding to the H5 game:

$$y = \sum_{i=1}^{N} a_i b_i,$$

where y represents the probability value, $a_i$ represents a weighting value corresponding to an $i^{th}$ condition, and when the web page source code satisfies the $i^{th}$ condition, a value of $b_i$ is a preset value greater than 0, or when the web page source code does not satisfy the $i^{th}$ condition, a value of $b_i$ is 0, and $1 \leq i \leq N$.

The determining unit 622 is configured to: if the probability value is greater than a preset threshold, determine that the web page source code satisfies a preset condition, and recognize the target web page as the web page corresponding to the H5 game, where the preset condition includes N conditions, and N is a positive integer greater than 1.

The grabbing module 610 includes a first grabbing unit 611, a first obtaining unit 612, a second grabbing unit 613, a second obtaining unit 614, and a third grabbing unit 615.

The first grabbing unit 611 is configured to grab a first web page corresponding to a first-layer URL of the game website by using a web crawler.

The first obtaining unit 612 is configured to obtain a second-layer URL from the first web page, where the second-layer URL is a URL corresponding to a game category.

The second grabbing unit 613 is configured to grab a second web page corresponding to the second-layer URL by using the web crawler.

The second obtaining unit 614 is configured to obtain a third-layer URL from the second web page, where the third-layer URL includes a URL corresponding to the H5 game.

The third grabbing unit 615 is configured to grab a third web page corresponding to the third-layer URL by using the web crawler, and determine the third web page as a target web page.

The grabbing module 610 further includes:
an extraction unit 616 and an adding unit 617.

The extraction unit 616 is configured to extract a game name and game introduction information from the second web page.

The adding unit 617 is configured to add the game introduction information to game details information corresponding to the game name.

The extraction module 640 includes a first extraction unit 641 and/or a second extraction unit 642 and/or a third extraction unit 643.

The first extraction unit 641 is configured to collect web page data matching a preset data collection rule from the rendered web page according to the data collection rule, and perform data mining on the web page data, to obtain the game details information corresponding to the H5 game.

The second extraction unit 642 is configured to extract the game details information corresponding to the H5 game from the rendered web page according to a pre-trained machine learning model.

The third extraction unit 643 is configured to perform visual analysis on the rendered web page, and when the rendered web page includes the game details information corresponding to the H5 game, separate the game details information corresponding to the H5 game and a background image of the rendered web page according to an analytical result of the visual analysis, to extract the game details information corresponding to the H5 game.

The extraction module 640 includes a construction unit 644, a third obtaining unit 645, a matching unit 646, and a fourth extraction unit 647.

The construction unit 644 is configured to construct a DOM tree structure of the rendered web page according to the web page source code, where the DOM tree structure includes one or more nodes.

The third obtaining unit 645 is configured to obtain at least one template of the game website, where the template is of the DOM tree structure.

The matching unit 646 is configured to select path information of the game details information from the template, and perform matching between the path information of the game details information and each node in the DOM tree structure.

The fourth extraction unit 647 is configured to: if the matching succeeds, extract the game details information corresponding to the path information from the rendered web page.

The apparatus further includes:

a first obtaining module 650 and a first determining module 660.

The first obtaining module 650 is configured to obtain communication time between n grabbing servers and the game website, where n is an integer greater than 1.

The first determining module 660 is configured to use a grabbing server having shortest communication time as a currently used grabbing server.

The apparatus further includes:

a second obtaining module 670 and a second determining module 680.

The second obtaining module 670 is configured to obtain time of communication with n game servers corresponding to the game website.

The second determining module 680 is configured to use a game server having shortest communication time as a game server for current grabbing.

The apparatus further includes:

a setting module 690, configured to set an initial value of a TCP CWnd as a preset threshold, where the preset threshold is an upper limit empirical value for receiving the grabbed target web page.

Accordingly, in an exemplary embodiment, the target web page on the game website is grabbed, the web page corresponding to the H5 game is recognized according to the web page source code of the target web page, dynamic rendering is performed on the web page corresponding to the H5 game, to obtain the rendered web page, and the game details information corresponding to the H5 game is extracted from the rendered web page, so that the server can accurately recognize the web page corresponding to the H5 game according to source code of the web page, and extract the game details information from the web page, thereby solving the problem that a large amount of manual work is needed to perform screening and information extraction on a grabbing result in the related art technologies. Therefore, exemplary embodiments improve the accuracy of recognizing, by the server, the web page corresponding to the H5 game, and improve the efficiency of extracting the game details information by the server.

Figure 8:
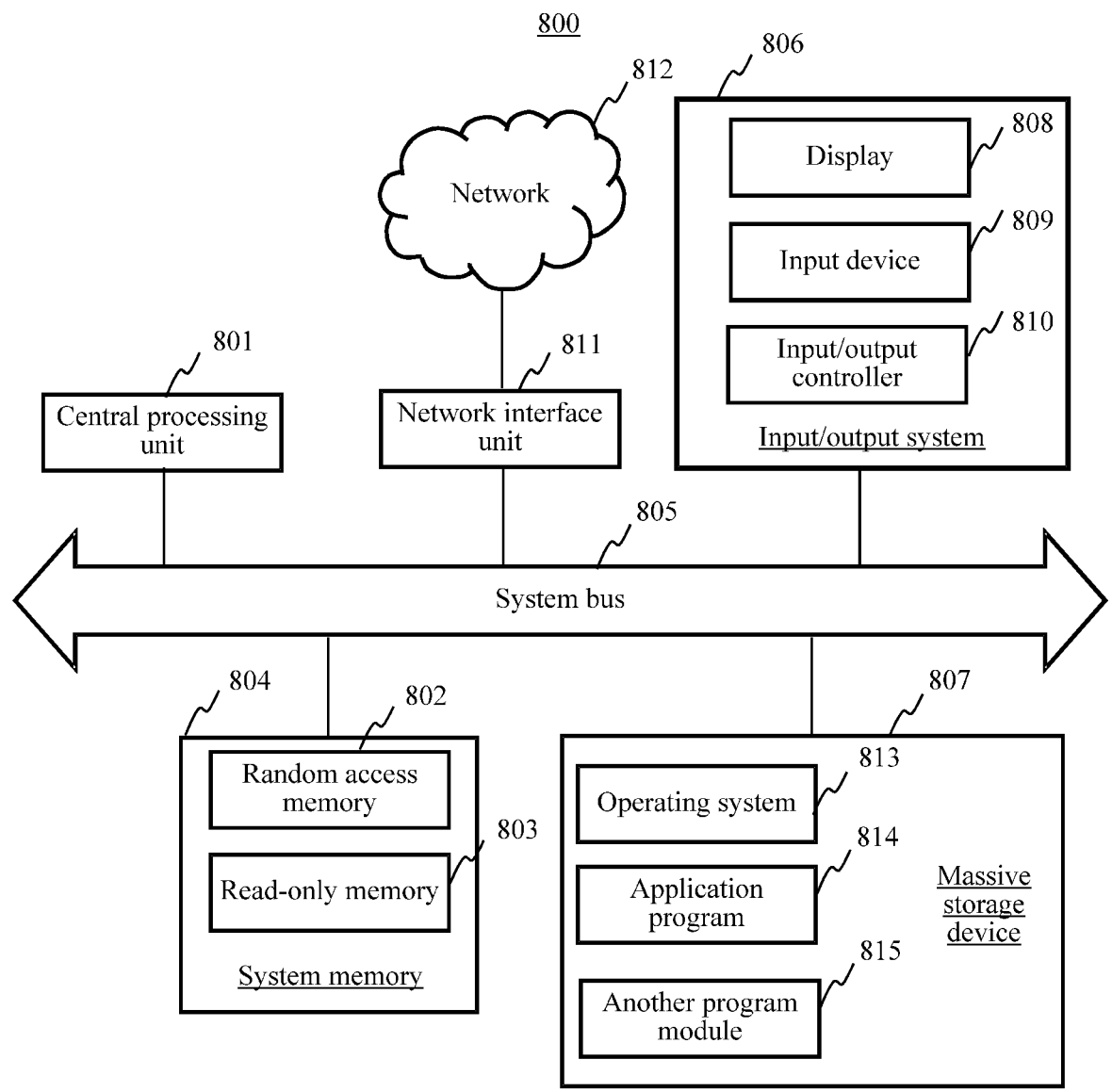
FIG. 8 is a block diagram of a server according to an exemplary embodiment.

FIG. 8 is a structural block diagram of a server according to an exemplary embodiment.

The server may be any one of an analysis server, a grabbing server, and a game server. Specifically, the server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output system (I/O system) 806 used for transmitting information between components in a computer, and a mass storage device 807 configured to store an operating system 813, an application program 814, and another program module 815.

The basic I/O system 806 includes a display 808 configured to display information, and an input device 809, such as a mouse and a keyboard, used for a user to input information. The display 808 and the input device 809 are connected to an input/output controller 810 of the system bus 805, to be connected to the CPU 801. The basic I/O system 806 may further include the input/output controller 810, to receive and process input received through multiple other devices (e.g., input devices), such as the keyboard, the mouse, or an electronic stylus. Similarly, the input/output controller 810 further provides an output to an output device such as a display, a printer, or another type of the output device.

The mass storage device 807 is connected to a mass storage controller (not shown) of the system bus 805, to be connected to the CPU 801. The mass storage device 807 and an associated computer readable medium provide non-volatile storage for the server 800. In other words, the massive storage device 807 may include a computer readable medium (not shown) such as a hard disk, or a CD-ROM drive.

Without loss of generality, the computer readable medium may include a computer storage medium and a communication medium. The computer storage medium includes volatile and/or non-volatile, and removable and/or non-removable mediums implemented by using any method or technology used for storing information such as a computer readable instruction, a data structure, a program module, or other data. The computer storage medium includes a RAM, a ROM, an EPROM, an EEPROM, a flash memory or other solid storage technologies; a CD-ROM, a DVD, or other optical storages; and a cassette, a magnetic tape, a disk storage, or other magnetic storage devices. Certainly, a person skilled in the art should know that the computer storage medium is not limited to the foregoing. The system memory 804 and the mass storage device 807 may be generally referred to as a memory.

According to various exemplary embodiments, the server 800 may further be connected, through a network such as Internet, a remote computer on the network for running. In other words, the server 800 may be connected to a network 812 by being connected to a network interface unit 811 on the system bus 805, or may be connected to a network of another type or a remote computer system (not shown) by using a network interface unit 811.

The memory 804 stores at least one instruction, and the at least one instruction is loaded and executed by a processor to implement the web page grabbing method provided in the method embodiment.

Sequence numbers of the foregoing exemplary embodiments are merely for description, but do not indicate the preference of the embodiments.

A person of ordinary skill in the art may understand that all or some operations in the web page grabbing method in the foregoing exemplary embodiments may be implemented by hardware, or by a program instructing related hardware. The program may be stored in a computer readable storage medium, and the storage medium may be a ROM, a magnetic disk, an optical disc, or the like. Alternatively, the storage medium stores at least one instruction, at least one segment of program, a code set, or an instruction set. The at least one instruction, at least one segment of program, the code set, or the instruction set are loaded and are executed by the processor, to implement the web page grabbing method in the exemplary embodiment.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The "unit" or "module" used herein may be a hardware component such as a processor or a circuit, and/or a software component that is executed by a hardware component such as a processor.

The foregoing descriptions are merely exemplary embodiments, but are not used to limit the embodiments. Any modification, equivalent replacement, improvement, or the like made within the spirit and scope of the exemplary embodiments shall fall within the protection scope of the exemplary embodiments.

What is claimed is:

1. A web page grabbing method, which is performed by a web page grabbing apparatus comprising at least one processor, the method comprising:
    obtaining, by the at least one processor, communication time between n grabbing servers and a website (n being an integer greater than 1) and determining, by the at least one processor, a grabbing server having shortest communication time;
    grabbing via the determined grabbing server, by the at least one processor, a target web page on the website, the target web page comprising a web page corresponding to a Hypertext Markup Language 5 (H5) content and a web page corresponding to a non-H5 content;
    detecting, by the at least one processor, the web page corresponding to the H5 content according to web page source code of the target web page;
    performing, by the at least one processor, dynamic rendering on the web page corresponding to the H5 content, to obtain a rendered web page; and
    extracting, by the at least one processor, content details information corresponding to the H5 content from the rendered web page.

2. The method according to claim 1, wherein the detecting comprises:
    in response to a theme name corresponding to the web page source code of the target web page matching a preset content key word, detecting the target web page as the web page corresponding to the H5 content.

3. The method according to claim 1, wherein the detecting comprises:
    in response to the web page source code of the target web page comprising code corresponding to a preset rendering technology, detecting the target web page as the web page corresponding to the H5 content, wherein
    the preset rendering technology comprises at least one of canvas and WebGL.

4. The method according to claim 1, wherein the detecting comprises:
    in response to the web page source code of the target web page comprising code corresponding to a preset content engine, detecting the target web page as the web page corresponding to the H5 content, wherein
    the preset content engine comprises at least one of an Egret engine, a cocos2dx-js engine, a Game Maker Studio engine, and a Construct 2 engine.

5. The method according to claim 1, wherein the detecting comprises:
    obtaining, by using the following formula, a probability value that the target web page is the web page corresponding to the H5 content:

$$y = \sum_{i=1}^{N} a_i b_i,$$

wherein y represents the probability value, $a_i$ represents a weighting value corresponding to an $i^{th}$ condition of a preset condition, the preset condition comprising N conditions, and in response to the web page source code satisfying the $i^{th}$ condition, a value of $b_i$ is a preset value greater than 0, and in response to the web page source code not satisfying the $i^{th}$ condition, the value of $b_i$ is 0, N is a positive integer greater than 1, and $1 \le i \le N$; and
based on the probability value being greater than a preset threshold, detecting the target web page as the web page corresponding to the H5 content.

6. The method according to claim 1, wherein the grabbing comprises:
grabbing a first web page corresponding to first-layer uniform resource locator (URL) of the website by using a web crawler;
obtaining a second-layer URL from the first web page, wherein the second-layer URL corresponds to a content category;
grabbing, by using the web crawler, a second web page corresponding to the second-layer URL;
obtaining a third-layer URL from the second web page, wherein the third-layer URL comprises a URL corresponding to the H5 content; and
grabbing, by using the web crawler, a third web page corresponding to the third-layer URL, and determining the third web page as the target web page.

7. The method according to claim 6, further comprising:
obtaining, by the at least one processor, a content name and content introduction information from the second web page; and
adding, by the at least one processor, the content introduction information to content details information corresponding to the content name.

8. The method according to claim 1, wherein the extracting comprises:
collecting web page data according to a preset data collection rule from the rendered web page; and
performing data mining on the web page data, to obtain the content details information corresponding to the H5 content.

9. The method according to claim 1, wherein the extracting comprises:
extracting the content details information corresponding to the H5 content from the rendered web page according to a pre-trained machine learning model.

10. The method according to claim 1, wherein the extracting comprises:
performing visual analysis on the rendered web page, and in response to the rendered web page comprising the content details information corresponding to the H5 content, separating the content details information corresponding to the H5 content and a background image of the rendered web page according to a result of the visual analysis, to extract the content details information corresponding to the H5 content.

11. The method according to claim 1, further comprising:
constructing, by the at least one processor, a document object model (DOM) tree structure of the rendered web page according to the web page source code, wherein the DOM tree structure comprises one or more nodes;
obtaining, by the at least one processor, at least one template of the website, wherein the at least one template is based on the DOM tree structure;
selecting, by the at least one processor, path information of the content details information from the at least one template, and performing matching between the path information of the content details information and each node in the DOM tree structure; and
based on the matching, extracting, by the at least one processor, the content details information corresponding to the path information from the rendered web page.

12. The method according to claim 1, further comprising:
obtaining, by the at least one processor, time of communication with m content servers km being an integer) corresponding to the website; and
determining, by the at least one processor, a content server having shortest communication time as a content server for current grabbing.

13. The method according to claim 1, further comprising:
setting, by the at least one processor, an initial value of a Transmission Control Protocol (TCP) congestion window (CWnd) as a preset threshold, wherein the preset threshold is an upper limit value for receiving the grabbed target web page.

14. The method according to claim 1, wherein the H5 content comprises a H5 game content.

15. A server, comprising:
at least one memory configured to store program code; and
at least one processor configured to access the at least one memory and operate according to the program code, the program code comprising:
code configured to cause the at least one processor to grab a target web page on a website, the target web page comprising a web page corresponding to an H5 content and a web page corresponding to a non-H5 content;
code configured to cause the at least one processor to detect the web page corresponding to the H5 content according to web page source code of the target web page;
code configured to cause the at least one processor to perform dynamic rendering on the web page corresponding to the H5 content, to obtain a rendered web page; and
code configured to cause the at least one processor to perform visual analysis on the rendered web page, and extract content details information corresponding to the H5 content from the rendered web page by separating the content details information corresponding to the H5 content and a background image of the rendered web page according to a result of the visual analysis.

16. The server according to claim 15, wherein the program code further comprises:
code configured to cause the at least one processor to, in response to a theme name corresponding to the web page source code of the target web page matching a preset content key word, detect the target web page as the web page corresponding to the H5 content.

17. The server according to claim 15, wherein the program code further comprises:
code configured to cause the at least one processor to, in response to the web page source code of the target web page comprising code corresponding to a preset rendering technology, detecting the target web page as the web page corresponding to the H5 content, wherein
the preset rendering technology comprises at least one of canvas and WebGL.

18. The server according to claim 15, wherein the program code further comprises:
code configured to cause the at least one processor to, in response to the web page source code of the target web page comprising code corresponding to a preset content engine, detecting the target web page as the web page corresponding to the H5 content, wherein
the preset content engine comprises at least one of an Egret engine, a cocos2dx-js engine, a Game Maker Studio engine, and a Construct 2 engine.

19. A non-transitory computer readable storage medium, the storage medium storing at least one of at least one instruction, at least one segment of program, a code set, and an instruction set, which, when executed by at least one processor, causes the at least one processor to perform:
   grabbing a first web page corresponding to first-layer uniform resource locator (URL) of a website by using a web crawler;
   obtaining from the first web page a second-layer URL corresponding to a content category, and grabbing a second web page corresponding to the second-layer URL by using the web crawler;
   obtaining from the second web page a third-layer URL corresponding to a Hypertext Markup Language 5 (H5) content, and grabbing a third web page corresponding to the third-layer URL by using the web crawler;
   detecting the third web page corresponding to the H5 content according to web page source code of the third web page;
   performing dynamic rendering on the third web page corresponding to the H5 content, to obtain a rendered web page; and
   extracting content details information corresponding to the H5 content from the rendered web page.

* * * * *